United States Patent
Chen et al.

(10) Patent No.: US 10,304,178 B2
(45) Date of Patent: May 28, 2019

(54) METHOD AND SYSTEM FOR DIAGNOSING A SEMICONDUCTOR WAFER

(71) Applicant: Taiwan Semiconductor Manufacturing Co., Ltd, Hsinchu (TW)

(72) Inventors: Peng-Ren Chen, Hsinchu (TW); Shiang-Bau Wang, Taoyuan (TW); Wen-Hao Cheng, Hsinchu (TW); Yung-Jung Chang, Cyonglin Township, Hsinchu County (TW); Wei-Chung Hu, New Taipei (TW); Yi-An Huang, New Taipei (TW); Jyun-Hong Chen, Taichung (TW)

(73) Assignee: TAIWAN SEMICONDUCTOR MANFACTURING COMPANY, LTD., Hsinchu (TW)

( * ) Notice: Subject to any disclaimer, the term of this patent is extended or adjusted under 35 U.S.C. 154(b) by 333 days.

(21) Appl. No.: 14/858,049

(22) Filed: Sep. 18, 2015

(65) Prior Publication Data

US 2017/0084016 A1    Mar. 23, 2017

(51) Int. Cl.
*G06K 9/62* (2006.01)
*G06T 7/00* (2017.01)

(52) U.S. Cl.
CPC ............ *G06T 7/001* (2013.01); *G06K 9/6204* (2013.01); *G06K 2209/19* (2013.01); *G06T 2207/10061* (2013.01); *G06T 2207/30148* (2013.01)

(58) Field of Classification Search
CPC .............................. G06T 7/001; G06K 9/6204
See application file for complete search history.

(56) References Cited

U.S. PATENT DOCUMENTS

| | | | |
|---|---|---|---|
| 6,612,159 B1 | 9/2003 | Knutrud | |
| 7,275,227 B1* | 9/2007 | Ying | G03F 1/36 716/52 |
| 7,455,939 B2* | 11/2008 | Brunner | G03B 27/00 257/48 |

(Continued)

FOREIGN PATENT DOCUMENTS

| | | |
|---|---|---|
| DE | 101 39 755 | 3/2002 |
| DE | 10 2004 031 877 | 3/2005 |

(Continued)

OTHER PUBLICATIONS

Office Action dated Apr. 12, 2017 from corresponding application No. KR 10-2015-0185324.

(Continued)

*Primary Examiner* — Jayanti K Patel
*Assistant Examiner* — Irfan Habib
(74) *Attorney, Agent, or Firm* — Hauptman Ham, LLP

(57) ABSTRACT

Methods and systems for diagnosing semiconductor wafer are provided. A target image is obtained according to graphic data system (GDS) information of a specific layout in the semiconductor wafer, wherein the target image includes a first contour having a first pattern corresponding to the specific layout. Image-based alignment is performed to capture a raw image from the semiconductor wafer according to the first contour. The semiconductor wafer is analyzed by measuring the raw image, so as to provide a diagnostic result.

20 Claims, 9 Drawing Sheets

(56) References Cited

U.S. PATENT DOCUMENTS

| | | | |
|---|---|---|---|
| 7,474,401 B2 * | 1/2009 | Ausschnitt | G03F 7/70633 356/401 |
| 7,608,468 B1 * | 10/2009 | Ghinovker | G03F 7/70633 356/401 |
| 7,626,702 B2 * | 12/2009 | Ausschnitt | G03F 7/70633 356/401 |
| 7,676,078 B2 * | 3/2010 | Fukuhara | G01N 21/95607 356/399 |
| 7,804,994 B2 * | 9/2010 | Adel | G03F 7/705 356/399 |
| 7,805,018 B2 * | 9/2010 | Lesellier | H04N 19/527 382/266 |
| 7,978,902 B2 * | 7/2011 | Usui | G06K 9/4604 382/145 |
| 8,031,329 B2 * | 10/2011 | Huang | G03F 7/70633 355/53 |
| 8,046,726 B2 * | 10/2011 | Lakshmanan | G06F 17/5081 716/111 |
| 8,111,900 B2 * | 2/2012 | Wu | G01N 21/95607 378/34 |
| 8,737,676 B2 * | 5/2014 | Tsuchiya | G06T 7/0002 382/100 |
| 9,097,989 B2 * | 8/2015 | Ausschnitt | G03F 1/14 |
| 2005/0002554 A1 | 1/2005 | Schulze et al. | |
| 2014/0151551 A1 | 6/2014 | Xiao | |
| 2014/0226893 A1 | 8/2014 | Lo et al. | |
| 2015/0110384 A1 | 4/2015 | Luoh et al. | |

FOREIGN PATENT DOCUMENTS

| | | |
|---|---|---|
| KR | 20020016586 | 3/2002 |
| KR | 20150089083 | 8/2015 |

OTHER PUBLICATIONS

German language office action dated May 11, 2016, issued in application No. DE 10 2015 118 011.5.

Office Action dated Oct. 31, 2017 from corresponding application No. TW 105129950.

* cited by examiner

METHOD AND SYSTEM FOR DIAGNOSING A SEMICONDUCTOR WAFER

BACKGROUND

In semiconductor technology, the wafers, each having multiple chips, are produced by a plurality of processes/stages in a wafer fabrication facility (FAB). Each process/stage can introduce one or more defects into the semiconductor wafers, which leads to quality and reliability issues, failures, and yield losses. To improve manufacturing technologies and enhance wafer quality, reliability, and yield, the semiconductor wafers are measured, tested, monitored and diagnosed at each process/stage. In order to obtain accurate results, alignment is important in a measured, tested, monitored and diagnosed semiconductor wafer.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
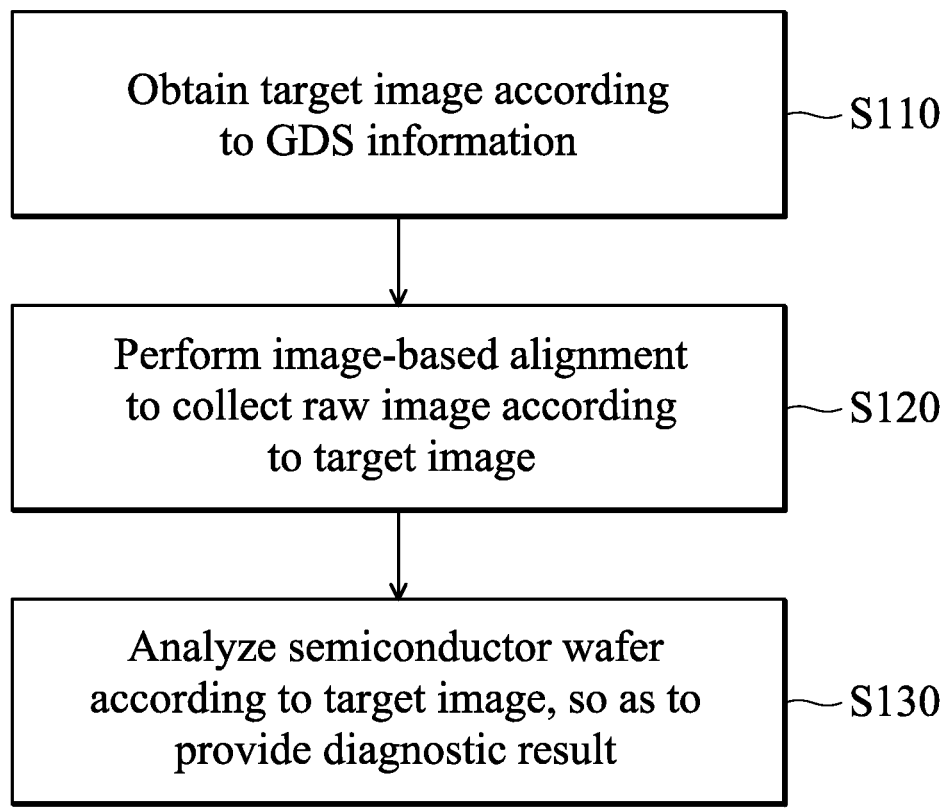
FIG. 1 shows a simplified flowchart of a method for diagnosing a semiconductor wafer, in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electronic design automation (EDA) tools, the library elements are mapped on to predefined layout cells, which contain prefigured elements such as transistors. The cells are chosen with the particular semiconductor process features and parameters in mind and create a process parameterized physical representation of the design. The design flow continues from that point by performing placement and routing of the local and global connections needed to form the completed design using the standard cells.

After design rule checks, design rule verification, timing analysis, critical path analysis, static and dynamic power analysis, and final modifications to the design, a tape out process is performed to produce photomask generation data. This photomask generation (PG) data is then used to create the optical masks used to fabricate the semiconductor device in a photolithographic process at a wafer fabrication facility (FAB). In the tape out process, the database file of the IC is converted into a Graphic Database System (GDS) file (e.g. a GDS file or a GDSII file). The GDS file is then used to make various layers of masks for integrated circuit manufacturing. Specifically, the GDS file became the industry's standard format for transfer of IC layout data between design tools of different vendors.

At present, a golden wafer is selected from a lot of wafers, and the golden wafer is used as a template wafer to measure, test, monitor or diagnose the other wafers in the lot of wafers. For example, a reference image is captured from the golden wafer, and the reference image includes information regarding contour and contrast of the golden wafer. The reference image is used to perform alignment and measurement for the other wafers, so as to verify these wafers. If a verification result is normal, the subsequent process/stage is performed for the verified wafer.

FIG. 1 shows a simplified flowchart of a method 100 for diagnosing a semiconductor wafer, in accordance with some embodiments of the disclosure. It should be noted that additional processes may be provided before, during, and/or after the method 100 of FIG. 1, and that some processes may only be briefly described herein. Furthermore, the method 100 of FIG. 1 can be performed at one or more process/stage for the semiconductor wafer.

Referring to FIG. 1, a target image is obtained according to a graphic data system (GDS) information of a specific layout of an integrated circuit (IC) (S110 of FIG. 1), and the IC will be implemented in a semiconductor wafer. In reality, as will be appreciated by persons skilled in the art, processing circuitry is utilized in the implementation of the invention, and the target image is represented by (or embodied in) an electrical signal. Thus, when it is said that the target image is obtained, it will be understood that an electrical signal embodying the target image is obtained via circuitry. The target image is a template for diagnosing the semiconductor wafer in a specific process/stage. In some embodiments, each process/stage has its own target image. Moreover, the specific layout is a fractional layout of the IC. The fractional layout includes a multi-layer structure of the IC. In some embodiments, the target image includes information regarding a pattern contour corresponding to the specific layout in the semiconductor wafer. For example, the target image includes a first contour, and the first contour has a first pattern corresponding to the specific layout.

Figure 2:
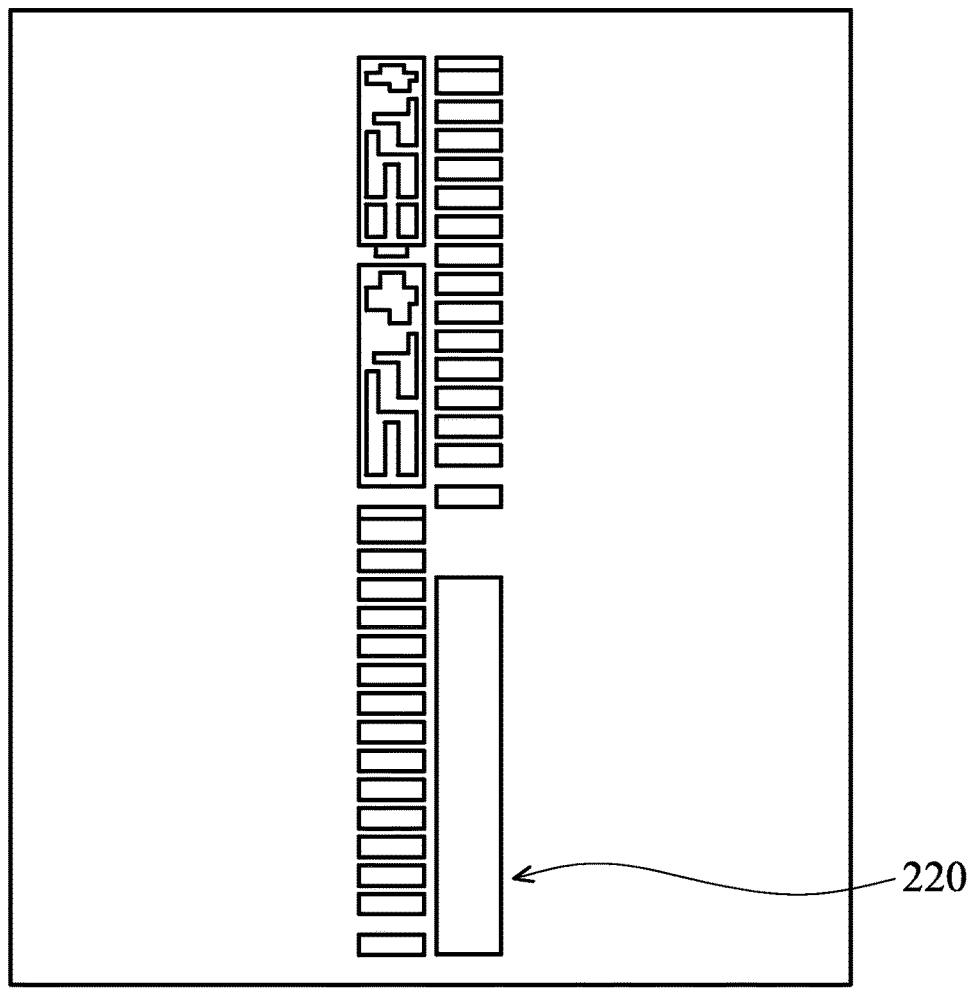
FIG. 2 shows a schematic view of a target image in one example.

FIG. 2 shows a schematic view of a target image 210 in one example. In FIG. 2, the target image 210 includes a first contour 220 having a first pattern corresponding to a specific layout. By performing image processing according to the GDS information, the first contour 220 is clear in the target image 210, and no contrast component is shown in the target image 210.

Because the first contour 220 in the target image 210 is clear and obvious, a high quality alignment image is provided according to the GDS information. For example, due to distortion of the golden wafer, a scanning electron microscope (SEM) controls the alignment weight of the contour and the contrast to obtain the reference image, such as a first weight (e.g. 30% contour+70% contrast) being modified to a second weight (e.g. 100% contour+0% contrast).

The SEM can scan a focused electron beam over a surface of the golden wafer to create the reference image. The electrons in the beam interact with the sample, producing various signals that can be used to obtain information about the surface topography and composition.

In some embodiments, various algorithms can be used to perform image processing in the first contour of the target image. Thus, the first contour of the target image will be closer to the actual situation for alignment. For example, the degree of smoothing can be modified for a line profile created from the first contour of the target image.

Referring back to FIG. 1, after obtaining the target image, an image-based alignment is performed, so as to capture a raw image from the semiconductor wafer according to the first contour of the target image (S120 of FIG. 1). For example, according to the information of target image (e.g. the contour and the related coordinates), the SEM can scan the beam across a selected area corresponding to the related coordinates, and the generated signals are recorded and thereby the raw image is formed pixel by pixel. Valuable information about morphology, surface topology and composition can be obtained in the raw image. The SEM microscopes achieving resolutions below 1 nm are available now.

In some embodiments, when the image-based alignment is performed, a second contour on the semiconductor wafer is compared with the first contour of the target image. When a second pattern of the second contour is identical to the first pattern of the first contour, the raw image having the second contour is captured from the semiconductor wafer.

After obtaining the raw image, the semiconductor wafer is diagnosed by measuring the obtained raw image, and then a diagnostic result of the semiconductor wafer is obtained (S130 of FIG. 1). In some embodiments, the diagnostic result indicates whether a feature is normal for each layer in the semiconductor wafer. If the diagnostic result is normal, the next process/stage is performed for the semiconductor wafer. Conversely, if the diagnostic result is abnormal, the current process/stage is suspended for checking.

If a SEM supports a measurement function, the SEM is capable of directly measuring the dimensions of the features in the semiconductor wafer, such as a critical dimension (CD), the widths and lengths of the metals, polys, active areas (ODs) and vias in the semiconductor wafer. For example, the SEM can capture an image according to the reference image corresponding to the golden wafer. Next, the SEM can measure the dimensions of the features in the semiconductor wafer by assigning cursors in the captured image. For example, a measuring feature is searched based on the recognition of the reference image, and the box cursors are automatically and regularly positioned in a measurement box, so as to perform auto measurement. Furthermore, the positions of the box cursors are determined according to the captured image.

Figure 3:
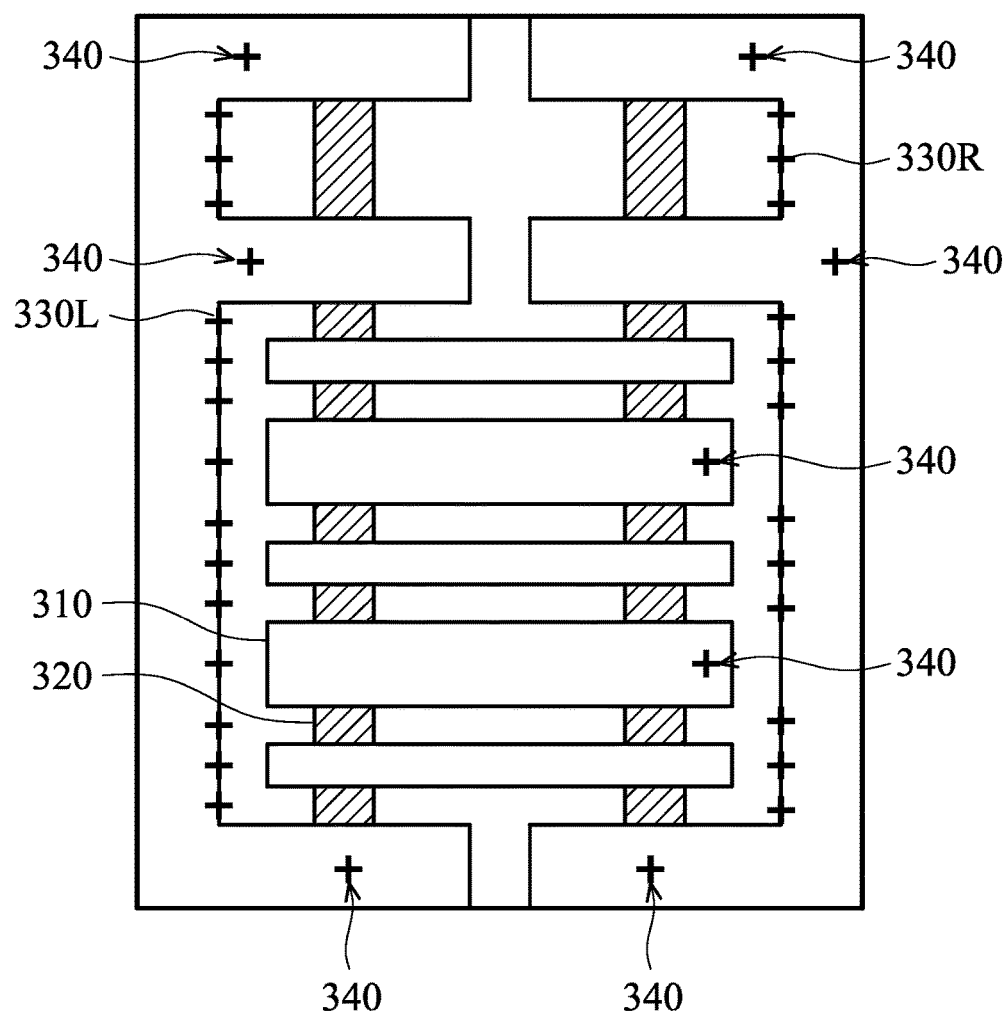
FIG. 3 shows a schematic illustrating a measurement box and a plurality of measurement cursors automatically and regularly positioned by a SEM that supports measurement function.

FIG. 3 shows a schematic illustrating a measurement box 300 and a plurality of measurement cursors automatically and regularly positioned by a SEM that supports a measurement function. In FIG. 3, two layers are observed in the measurement box 300, with a first layer 310 being disposed on a second layer 320. The measurement cursors include a plurality of pairs of cursors, and each pair of cursors is formed by a left cursor 330L and a right cursor 330R. Due to interference induced by the contrast in the measurement box 300, the measurement cursors 330L and 330R will be positioned inaccurately, e.g. the measurement cursors labeled as 340.

Figure 4:
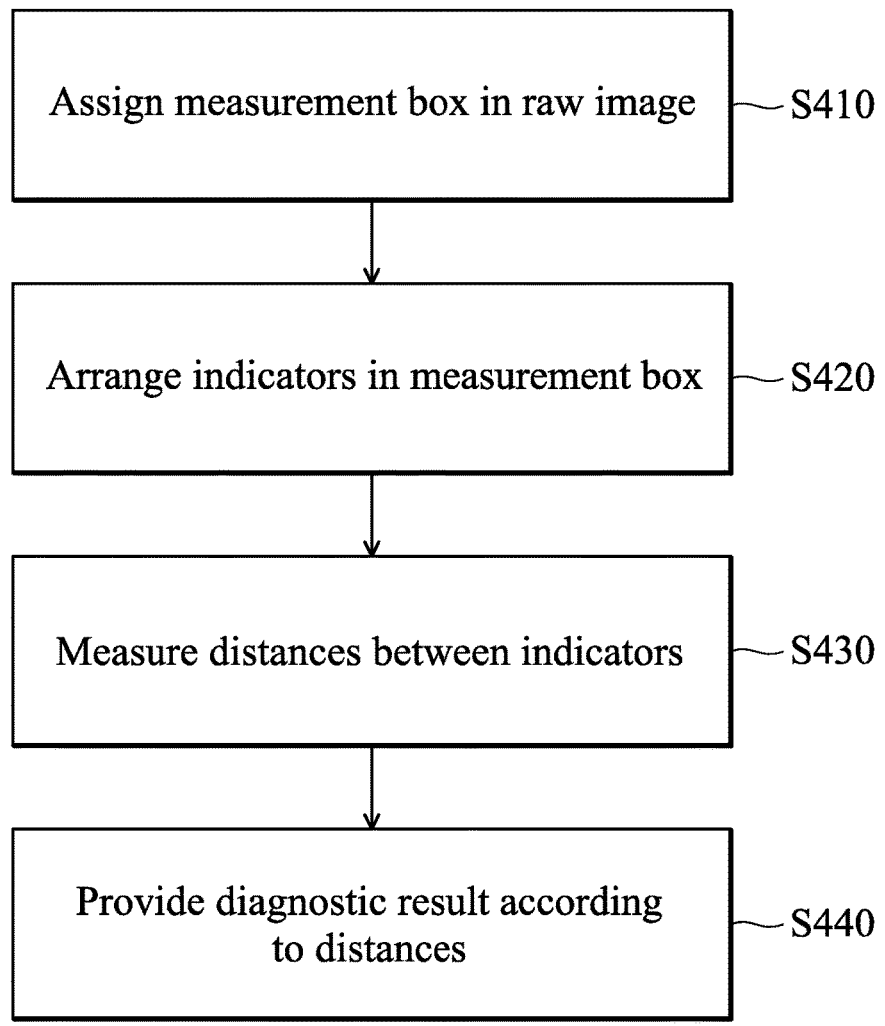
FIG. 4 shows a simplified flowchart of a method for analyzing a raw image from a semiconductor wafer according to GDS information, in accordance with some embodiments of the disclosure.

FIG. 4 shows a simplified flowchart of a method 400 for analyzing a raw image from a semiconductor wafer according to GDS information (e.g. S130 of FIG. 1), in accordance with some embodiments of the disclosure. It should be noted that additional processes may be provided before, during, and/or after the method 400 of FIG. 4, and that some processes may only be briefly described herein. Furthermore, the method 400 of FIG. 4 can be performed in one or more process/stage for the semiconductor wafer.

As mentioned above, the raw image is captured when an image-based alignment is performed according to the GDS information of the semiconductor wafer. After obtaining the raw image, a measurement box is assigned in the raw image according to the GDS information (S410 of FIG. 4). In some embodiments, for the semiconductor wafer, there are various features to be verified in the pattern of layout, and the raw image can includes more than one feature. According to the predetermined coordinates of the features, the measurement box is assigned in the raw image, so as to measure the features. A portion of the second pattern of the raw image can be viewed via the measurement box. In some embodiments, the raw image is zoomed in to assign the measurement box.

When the measurement box is assigned, a plurality of indicators is arranged/positioned in the second pattern of the raw image within the measurement box according to the GDS information (S420 of FIG. 4). Specifically, the number of indicators and positions of the indicators are determined according to the GDS information. In some embodiments, the indicators are the box cursors. Furthermore, the number of box cursors is less than the number of box cursors automatically and regularly positioned by the SEM that supports the measurement function. Fewer indicators are positioned in the measurement box, thereby reducing the interference of the measurement. Specifically, no additional indicator is positioned in the measurement box.

In some embodiments, the indicators are divided into a plurality of indicator pairs, and each indicator pair is arranged to measure a feature in the measurement box. For example, the feature to be measured in the raw image is a critical dimension (CD) of the semiconductor wafer, a width or a length of a feature of the second pattern (e.g. the width/length of conductive line), or a distance between the two features of the second pattern (e.g. the space between two conductive lines, or active area).

When the indicators are arranged in the measurement box according to the GDS information, a distance between the two indicators is measured in the measurement box (S430 of FIG. 4), so as to obtain a dimension of a portion of the second pattern in the raw image. In some embodiments, the distance between the two indicators is the CD of the semiconductor wafer, a width or a length of a feature of the second pattern in the raw image, or a distance between the two features of the second pattern in the raw image. Due to the interference induced by the large number of indicators being decreased, the distance between the two indicators can be accurately measured. Thus, measurement error is decreased.

When the distances between the indicators in the measurement box are measured completely, a diagnostic result is provided according to the measured distances (S440 of FIG. 4). In some embodiments, the diagnostic result of the raw image indicates whether the measured values are normal in the measurement box. If the diagnostic result is normal, the features are normal in the current process/stage for the semiconductor wafer, and the next process/stage may be performed. Conversely, if the diagnostic result is abnormal, the current process/stage is suspended for checking the semiconductor wafer.

Figure 5A:
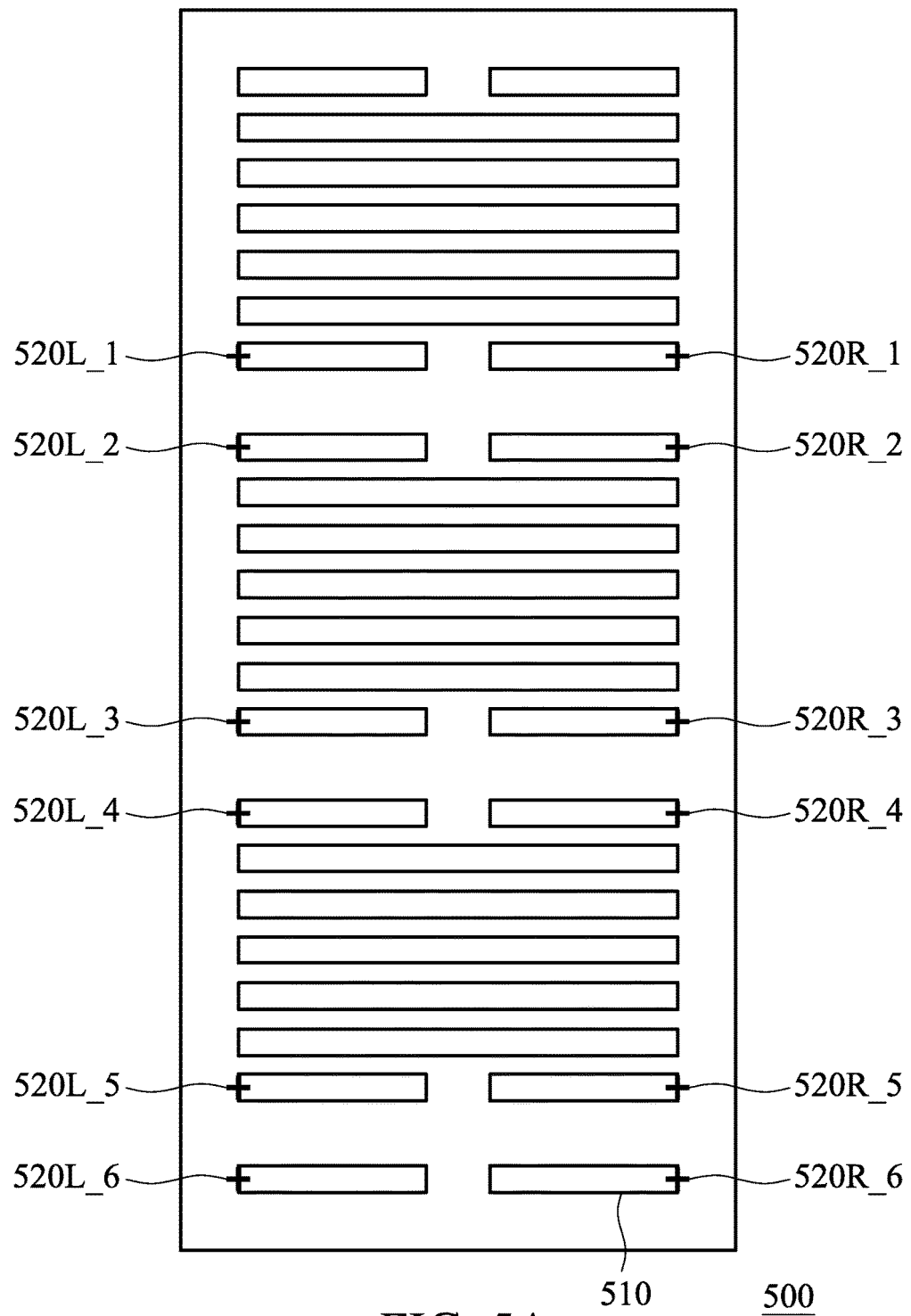
FIG. 5A shows a schematic view of a measurement box in one example.
Figure 5B:
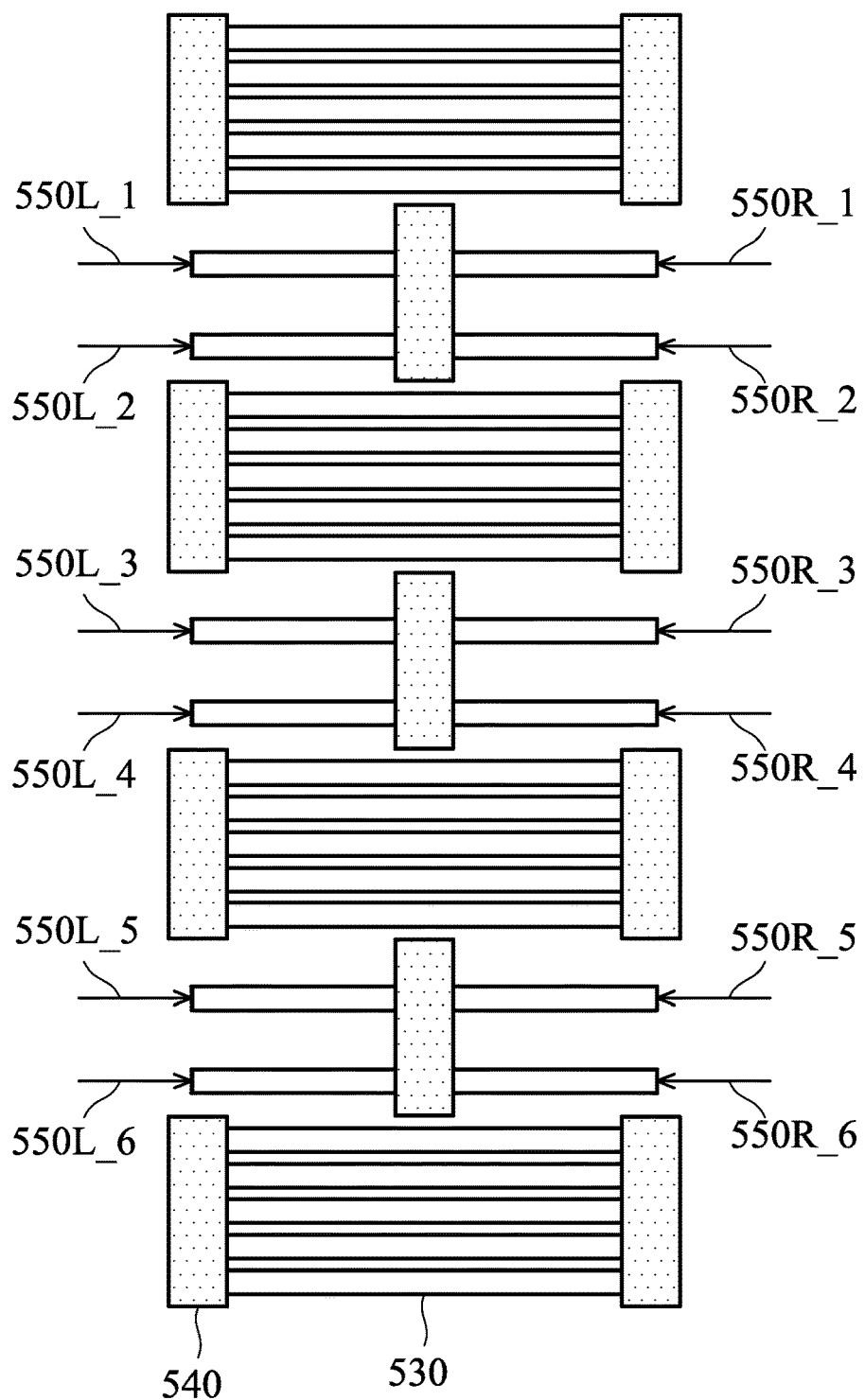
FIG. 5B shows a schematic view of GDS information of the semiconductor wafer, and the GDS information is used to captured the raw image including the measurement box of FIG. 5A from the semiconductor wafer.

FIG. 5A shows a schematic view of a measurement box 500 in one example. The measurement box 500 is obtained from a raw image captured from a semiconductor wafer. FIG. 5B shows a schematic view of GDS information of the semiconductor wafer, and the GDS information is used to capture the raw image comprising the measurement box 500 of FIG. 5A from the semiconductor wafer. In some embodiments, the raw image is captured by an image capturing mechanism (e.g. SEM) according to the GDS information of the semiconductor wafer.

A single-layer structure is shown in the measurement box 500 of FIG. 5A. In some embodiments, the single-layer structure is a portion of the second pattern in the raw image. The single-layer structure includes a plurality of conductive lines 510. The conductive lines 510 can be polysilicon lines or metal lines, for example.

The GDS information of the single-layer structure of FIG. 5A is shown in FIG. 5B. In some embodiments, the GDS information includes a plurality of conductive lines 530 and a plurality of cut lines 540. For integrated circuit layouts, the conductive lines 530 are cut with a cut pattern formed by the cut lines 540, such as a cut poly (CPO) pattern.

The conductive lines 530 in the GDS information represent electrically conductive lines to be formed in a physical integrated circuit over a substrate of the semiconductor wafer. The conductive lines 530 can include polysilicon or other electrically conductive material such as metal in a metal layer. The cut lines 540 represent cut sections or patterning area where the conductive lines 530 are removed for electrical connections/disconnections according to the integrated circuit design in the current stage.

In FIG. 5A, the conductive lines 510 are divided into two groups: short lines and long lines. The short lines are parallel to the long lines, and the long lines are parallel with each other. According to the GDS information of FIG. 5B, the short lines 510 in the same horizontal line are formed by arranging the cut line 540 in the middle of the corresponding conductive line 530. Furthermore, the long line 510 is formed by arranging two cut lines 540 on the both sides of the corresponding conductive line 530, respectively.

If a dimension of the conductive line 530 cut in the middle by the cut line 540 is to be measured, a first sign (e.g. 550L-1 to 550L-6) is assigned to a left side of the conductive line 530, and a second sign (e.g. 550R-1 to 550R-6) is assigned to a right side of the conductive line 530. According to the first and second signs of the GDS information, the indicators can be accurately arranged in the measurement box, so as to obtain the actual dimension in the semiconductor wafer.

In the measurement box 500 of FIG. 5A, a half of the short lines are located at the left side of the measurement box 500, and a plurality of indicators 520L_1 to 520L-6 are arranged at the left side of the half of the short lines according to the first signs 550L-1 to 550L-6 of FIG. 5B. Furthermore, the other half of the short lines are located at the right side of the measurement box 500, and a plurality of indicators 520R_1 to 520R-6 are arranged at the right side of the half of the short lines according to the second signs 550R-1 to 550R-6 in the GDS information of FIG. 5B.

For example, in the measurement box 500 of FIG. 5A, the indicator 520L_1 is arranged according to the first sign 550L_1 of FIG. 5B, and the indicator 520R_1 is arranged according to the second sign 550R_1 of FIG. 5B. The indicator 520L_5 is arranged according to the first sign 550L_5 of FIG. 5B, and the indicator 520R_5 is arranged according to the second sign 550R_5 of FIG. 5B.

In some embodiments, the indicators 520L_1 to 520L-6 and 520R_1 to 520R-6 are box cursors in the measurement box 500 of FIG. 5A. After arranging the indicators 520L_1 to 520L-6 and the indicators 520R_1 to 520R-6, the distances between the indicators 520L_1 to 520L-6 and the indicators 520R_1 to 520R-6 are measured.

By using the GDS information to assign the indicators in the measurement box, the number of indicators and positions of the indicators can be controlled in advance. Thus, the interference caused by the large number of indicators can be decreased. No additional indicator is positioned in the measurement box. Furthermore, by using the GDS information to distinguish the features, contours and patterns in the raw image, the interference induced by the contrast in the raw image also can be decreased.

Figure 6A:
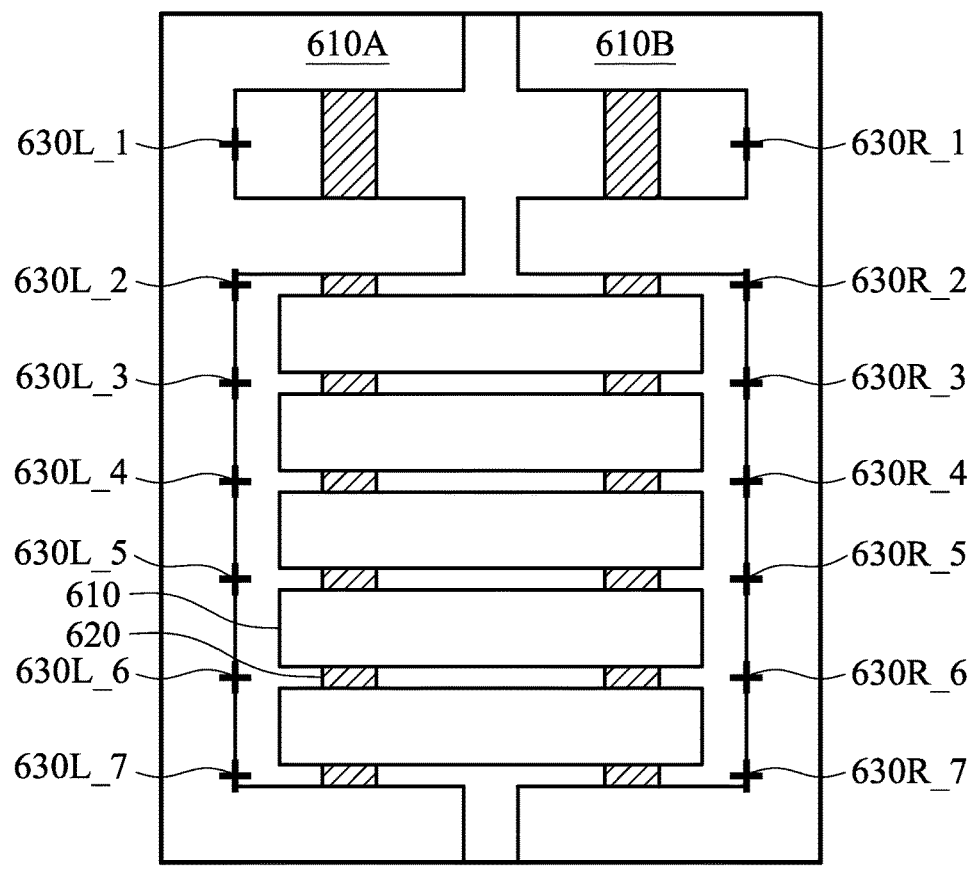
FIG. 6A shows a schematic view of a measurement box in another example.
Figure 6B:
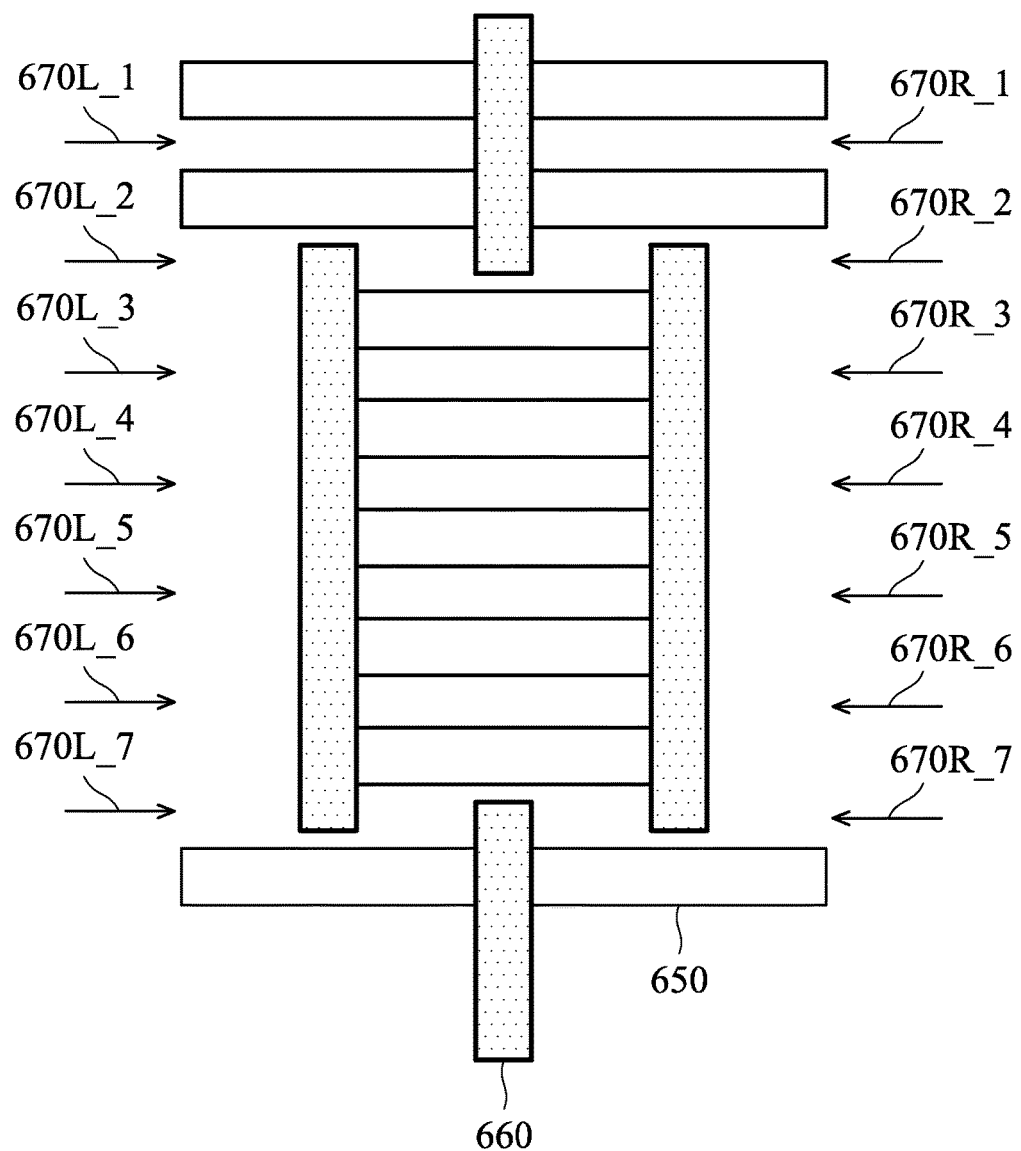
FIG. 6B shows a schematic view of GDS information of the semiconductor wafer, and the GDS information is used to captured the raw image including the measurement box of FIG. 6A from the semiconductor wafer.

FIG. 6A shows a schematic view of a measurement box 600 in another example. The measurement box 600 is obtained from a raw image captured from a semiconductor wafer. FIG. 6B shows a schematic view of GDS information of the semiconductor wafer, and the GDS information is used to captured the raw image comprising the measurement box 600 of FIG. 6A from the semiconductor wafer. In some embodiments, the raw image is captured by an image capturing mechanism (e.g. SEM) according to the GDS information of the semiconductor wafer.

A multi-layer structure is shown in the measurement box 600 of FIG. 6A. In some embodiments, the multi-layer structure is a portion of the second pattern in the raw image. The multi-layer structure includes a first layer having a plurality of conductive lines 610, and a second layer having a plurality of conductive lines 620. The first layer is disposed on the second layer, and a cross-layer structure is formed. The conductive lines 610 and 620 can be polysilicon lines and/or metal lines, for example.

The GDS information of the first layer of FIG. 6A is shown in FIG. 6B. In some embodiments, the GDS information includes a plurality of conductive lines 650 and a plurality of cut lines 660. For integrated circuit layouts, the conductive lines 650 are cut with a cut pattern formed by the cut lines 660.

The conductive lines 650 in the GDS information represent electrically conductive lines to be formed in a physical integrated circuit over a substrate of the semiconductor wafer. The conductive lines 650 can include polysilicon or other electrically conductive material such as metal in a metal layer. The cut lines 660 represent cut sections or patterning area where the conductive lines 650 are removed for electrical connections/disconnections according to the integrated circuit design in the current stage.

In FIG. 6A, the conductive lines 610 are divided into two groups: outer lines and inner lines. The inner lines are parallel to each other, and the inner lines are surrounded by the outer lines. According to the GDS information of FIG. 6B, the outer lines are formed by arranging the cut line 660 in the middle of the corresponding conductive line 650. Furthermore, the inner lines are formed by arranging two cut lines 650 on both sides of the corresponding conductive lines 650, respectively.

According to the GDS information of FIG. 6B, a first sign (e.g. 670L-1 to 670L-7) is assigned at the left side of the conductive lines 650, and a second sign (e.g. 670R-1 to 670R-7) is assigned at the right side of the conductive lines 650. According to the first and second signs of the GDS information, the indicators can be accurately arranged in the measurement box, so as to obtain the actual dimensions in the semiconductor wafer.

In the measurement box 600 of FIG. 6A, a portion of conductive lines 610 form a first pattern (labeled as 610A). The first pattern of conductive lines 610 is located at the left side of the measurement box 600, and a plurality of indicators 630L_1 to 630L-7 are arranged at the edge of the first pattern according to the first signs 670L_1 to 670L-7 in the GDS information of FIG. 6B.

In the measurement box 600 of FIG. 6A, a portion of conductive lines 610 form a second pattern (labeled as 610B), and the second pattern is opposite from the first pattern. The second pattern of conductive lines 610 is located at the right side of the measurement box 600, and a plurality of indicators 630R_1 to 630R-7 are arranged at the edge of the second pattern according to the second signs 670R_1 to 670R-7 in the GDS information of FIG. 6B.

For example, in the measurement box 600 of FIG. 6A, the indicator 630L_1 is arranged according to the first sign 670L_1 of FIG. 6B, and the indicator 630R_1 is arranged according to the second sign 670R_1 of FIG. 6B. The indicator 630L_4 is arranged according to the first sign 670L_4 of FIG. 6B, and the indicator 630R_4 is arranged according to the second sign 670R_4 of FIG. 6B.

In some embodiments, the indicators 630L_1 to 630L-7 and the indicators 630R_1 to 630R-7 are box cursors in the measurement box 600 of FIG. 6A. After arranging the indicators 630L_1 to 630L-7 and the indicators 630R_1 to 630R-7, the distances between the indicators 630L_1 to 630L-7 and the indicators 630R_1 to 630R-7 are measured.

Figure 7:
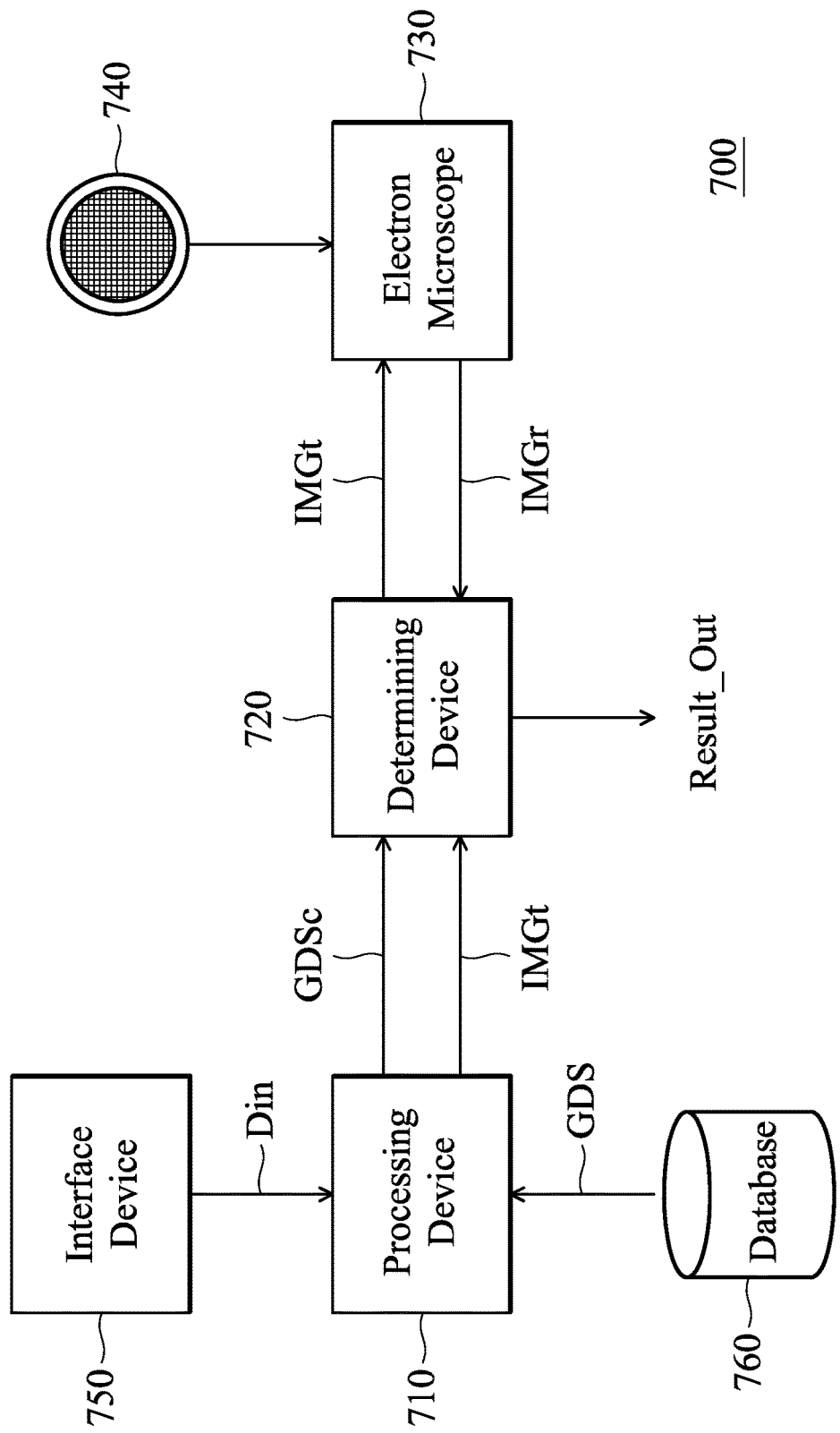
FIG. 7 shows a simplified diagram of a system 700 for diagnosing a semiconductor wafer, in accordance with some embodiments of the disclosure.

FIG. 7 shows a simplified diagram of a system 700 for diagnosing a semiconductor wafer, in accordance with some embodiments of the disclosure. The system 700 includes a processing device (e.g., circuitry) 710, a determining device (e.g., circuitry) 720, and an electron microscope 730.

A plurality of IC will be implemented in the semiconductor wafer 740 via various processes/stages at a wafer fabrication facility. When each process/stage is performed, the semiconductor wafer 740 will be verified and diagnosed via the system 700.

The semiconductor wafer 740 to be diagnosed is loaded in the electron microscope 730. In some embodiments, the electron microscope 730 can be an image capturing mechanism, and the image capturing mechanism is capable of capturing a raw image from the semiconductor wafer 740.

In some embodiments, the system 700 further includes an interface device 750, and a database 760.

The processing device 710 can obtain a graphic database system file GDS of the IC to be implemented in the semiconductor wafer 740. In some embodiments, the file GDS is obtained from the database 760. In some embodiments, the file GDS is obtained from a remote server.

Furthermore, the processing device 710 can further obtain a user input Din from the interface device 750. In some embodiments, the user input Din includes information regarding coordinates and patterns in the layout of the IC.

In the system 700, the processing device 710 can obtain GDS information in the file GDS. In response to the information of the user input Din, the processing device 710 can clip the GDS information to provide a target image IMGt, thereby providing increased flexibility based on improvement in handling customized requirements. In some embodiments, the target image IMGt includes a first contour having a first pattern corresponding to a specific layout of the IC, and the specific layout includes a multi-layer structure. In some embodiments, the processing device 710 can provide the clipped GDS information GDSc corresponding to the target image IMGt. In some embodiments, the clipped GDS information GDSc includes the information (e.g. the first and second signs) regarding the indicators to be assigned in a measurement box.

In some embodiments, the file GDS includes layout information about each layer of the IC of the semiconductor wafer 740. The processing device 710 can provide the target images IMGt for the corresponding layer of the semiconductor wafer 740.

The target images IMGt include little layout information, thus it is difficult to effectively and sufficiently gather information from the target images IMGt. Therefore, information regarding circuit design and circuit layout of the IC can be kept secret.

In some embodiments, the processing device 710 can provide the target images IMGt to the electron microscope 730 via the determining device 720. In some embodiments, the processing device 710 can directly provide the target images IMGt to electron microscope 730 without passing through the determining device 720.

According to the first contour of the target images IMGt, the electron microscope 730 can perform image-based alignment to capture a raw image IMGr from the loaded semiconductor wafer 740. As mentioned above, the raw image IMGr includes a second contour in the semiconductor wafer 740, and the second contour matches the first contour of the target images IMGt.

In some embodiments, the contours of the semiconductor wafer are compared with the first contour of the target images IMGt. If a second pattern of the second contour is identical to the first pattern of the first contour, the raw image IMGr having the second contour is captured from the semiconductor wafer 740.

After capturing the raw image IMGr, the electron microscope 730 outputs the raw image IMGr to the determining device 720. Compared with a SEM supporting measurement function in an on-line manner, the determining device 720 is capable of provide an off-line measurement for the semiconductor wafer 740.

After obtaining the raw image IMGr, the determining device 720 can assign a measurement box in the raw image IMGr. The determining device 720 can arrange the indicators in the measurement box according to the clipped GDS information GDSc, as mentioned above.

After the indicators are positioned, the determining device 720 can measure the distances between the indicators, and the dimensions of a portion of the second pattern are obtained. In some embodiments, the dimension of the portion of the second pattern is a critical dimension of the semiconductor wafer, a width or a length of a first feature of the second pattern (e.g. the width/length of conductive line), or a distance between the first feature and a second feature of the second pattern (e.g. the space between two conductive lines, or active area).

According to the measured dimensions, the determining device 720 can provide a diagnostic result Result_Out. In some embodiments, the diagnostic result Result_Out indicates whether the dimension of the portion of the second pattern is normal.

If the diagnostic result Result_Out is normal, the features of the semiconductor wafer 740 are normal in the current process/stage for the semiconductor wafer. In response to the diagnostic result Result_Out, the electron microscope 730 may unload the semiconductor wafer 740 to perform subsequent processes/stages. Conversely, if the diagnostic result Result_Out is abnormal, i.e. measure failure, the current process/stage is suspended for checking the semiconductor wafer 740.

Embodiments for diagnosing a semiconductor wafer are provided. A target image is obtained according to GDS information of the semiconductor wafer. An image-based alignment is performed according to the target image, and a raw image is captured. The raw image includes a second contour corresponding to a first contour of the target image. The raw image is measured in an off-line manner. A measurement box is assigned in the raw image according to the GDS information. A plurality of indicators is arranged in the features within the measurement box. A diagnostic result is provided according to the dimensions of the features for the semiconductor wafer. The dimension of the feature can be a critical dimension of the semiconductor wafer, a width or a length of the feature (e.g. the width/length of conductive line), or a distance from the feature to the other feature (e.g. the space between two conductive lines, or active area).

By using the GDS information to perform alignment and measurement for the semiconductor chip, a high quality image with good contrast is used as a reference image to capture the raw image from the semiconductor chip. Thus, failure rate is decreased for alignment, and tooling time of the image capturing mechanism can be decreased. Furthermore, measurement is accurate by assigning the indicators in the measurement box according to the GDS information. Thus, process capability index (CPK) is stable, and manufacturing cost (e.g. manpower and tooling time) is decreased.

In some embodiments, a method for diagnosing a semiconductor wafer is provided. A target image is obtained according to graphic data system (GDS) information of a specific layout in the semiconductor wafer, wherein the target image comprises a first contour having a first pattern corresponding to the specific layout. Image-based alignment is performed to capture a raw image from the semiconductor wafer according to the first contour. The semiconductor wafer is analyzed by measuring the raw image, so as to provide a diagnostic result.

In some embodiments, a method for diagnosing a semiconductor wafer is provided. Image-based alignment is performed to capture a raw image from the semiconductor wafer according to graphic data system (GDS) information of a specific layout in the semiconductor wafer. A measurement box is assigned in the raw image. At least one pair of indicators is arranged in the measurement box of the raw image. A distance between the indicators is measured. The semiconductor wafer is analyzed according to the measured distance, so as to provide a diagnostic result.

In some embodiments, a system for diagnosing a semiconductor wafer is provided. The system includes a processing device, an electron microscope, and a determining device. The processing device provides a target image according to graphic data system (GDS) information of a specific layout in the semiconductor wafer. The electron microscope receives the target image, and performs image-based alignment to provide a raw image. The raw image is captured from the semiconductor wafer according to the target image. The determining device receives the raw image from the electron microscope. The determining device assigns a measurement box in the raw image according to the input information. The determining device provides a diagnostic result according to the measurement box.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for it role and use in the facilitation of the design process of electronic and digital systems.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-based method of diagnosing a semiconductor wafer, the method comprising:
    obtaining an electrical signal representative of a target image according to graphic data system (GDS) information of a specific layout in the semiconductor wafer, wherein the target image comprises a first contour having a first pattern corresponding to the specific layout;
    capturing a raw image from the semiconductor wafer after performing an image-based alignment according to the first contour; and analyzing the semiconductor wafer by measuring the raw image, so as to provide a diagnostic result,
wherein at least one of the performing image-based alignment or the analyzing the semiconductor wafer comprises using processor circuitry.

2. The method as claimed in claim 1, wherein the specific layout comprises a multi-layer structure.

3. The method as claimed in claim 1, wherein the raw image comprises a second contour that matches the first contour, and the capturing the raw image comprises capturing the raw image by an electron microscope.

4. The method as claimed in claim 1, wherein the capturing the raw image of the semiconductor wafer after performing the image-based alignment according to the first contour comprises:
comparing a second contour of the semiconductor wafer with the first contour; and
capturing the raw image having the second contour from the semiconductor wafer when a second pattern of the second contour is identical to the first pattern of the first contour.

5. The method as claimed in claim 4, wherein the analyzing the semiconductor wafer by measuring the raw image comprises:
assigning a measurement box in the raw image; and
obtaining a dimension of a portion of the second pattern in the measurement box,
wherein the diagnostic result indicates whether the dimension of the portion of the second pattern is normal.

6. The method as claimed in claim 5, wherein the dimension of the portion of the second pattern is a critical dimension of the semiconductor wafer, a width or a length of a first feature of the second pattern, or a distance between the first feature and a second feature of the second pattern.

7. A method of diagnosing a semiconductor wafer, wherein the method comprises using processing circuitry to perform one or more operations, the one or more operations comprising:
capturing a raw image from the semiconductor wafer after performing an image-based alignment according to graphic data system (GDS) information of a specific layout in the semiconductor wafer;
assigning a measurement box in the raw image;
arranging at least one pair of indicators in the measurement box of the raw image;
measuring a distance between the indicators; and
analyzing the semiconductor wafer according to the measured distance, so as to provide a diagnostic result.

8. The method as claimed in claim 7, wherein the specific layout comprises a multi-layer structure.

9. The method as claimed in claim 7, wherein the raw image comprises a contour corresponding to a pattern of the specific layout, and the capturing the raw image comprises capturing the raw image by an electron microscope.

10. The method as claimed in claim 9, wherein the arranging the indicators in the measurement box of the raw image comprises:
arranging a first indicator at a first position of the pattern in the measurement box according to the GDS information; and
arranging a second indicator at a second position of the pattern in the measurement box according to the GDS information,
wherein the second position is opposite from the first position in the measurement box of the raw image.

11. The method as claimed in claim 10, wherein the analyzing the semiconductor wafer according to the measured distance comprises:
obtaining the measured distance between the first and second positions; and
obtaining a dimension of a portion of the pattern according to the measured distance,
wherein the diagnostic result indicates whether the dimension of the portion of the pattern is normal.

12. The method as claimed in claim 11, wherein the dimension of the portion of the pattern is a critical dimension of the semiconductor wafer, a width or a length of a first feature of the pattern, or a distance between the first feature and a second feature of the pattern.

13. The method as claimed in claim 7, wherein a number of the indicators and positions of the indicators are determined according to the GDS information.

14. A system for diagnosing a semiconductor wafer, the system comprising:
processing circuitry configured to provide a target image according to graphic data system (GDS) information of a specific layout in the semiconductor wafer;
an electron microscope configured to receive the target image, perform an image-based alignment based on the received target image, and provide a raw image, wherein the raw image is captured from the semiconductor wafer according to the target image and after the image-based alignment; and
determining circuitry configured to receive the raw image from the electron microscope, assign a measurement box in the raw image according to input information, and provide a diagnostic result according to the measurement box.

15. The system as claimed in claim 14, wherein the specific layout comprises a multi-layer structure.

16. The system as claimed in claim 14, wherein the target image comprises a first contour having a first pattern corresponding to the specific layout, and the raw image comprises a second contour that matches the first contour.

17. The system as claimed in claim 16, wherein the electron microscope is configured to compare the second contour of the semiconductor wafer with the first contour, and capture the raw image having the second contour from the semiconductor wafer when a second pattern of the second contour is identical to the first pattern of the first contour.

18. The system as claimed in claim 14, wherein the determining circuitry is configured to assign the measurement box in the raw image, and arrange at least one pair of indicators in the measurement box according to the GDS information, wherein the indicators are arranged in opposite positions in the measurement box of the raw image, and the number of indicators and positions of the indicators are determined according to the GDS information.

19. The system as claimed in claim 14, wherein the raw image comprises a pattern corresponding to a contour of the specific layout, and the determining circuitry is configured to respectively arrange a first indicator and a second indicator at a first position and a second position of the pattern in the measurement box, wherein the second position is opposite from the first position in the measurement box of the raw image, and the determining circuitry is configured to obtain a dimension of a portion of the pattern according to a measurement distance between the first and second positions, wherein the diagnostic result indicates whether the dimension of the portion of the pattern is normal.

20. The system as claimed in claim 19, wherein the dimension of the portion of the pattern is a critical dimension of the semiconductor wafer, a width or length of a first feature of the pattern, or a distance between the first feature and a second feature of the pattern.

\* \* \* \* \*